(12) United States Patent
Scheriber et al.

(10) Patent No.: US 12,395,507 B1
(45) Date of Patent: Aug. 19, 2025

(54) TECHNIQUES FOR CYBERSECURITY EVENT CLASSIFICATION IN DATAFLOW MANAGEMENT

(71) Applicant: Cyera, Ltd., Tel Aviv (IL)

(72) Inventors: Yuval Scheriber, Tel Aviv (IL); Zohar Vittenberg, Tel Aviv (IL); Nadav Zingerman, Tel Aviv (IL); Roei Mutay, Ramat Gan (IL)

(73) Assignee: Cyera, Ltd., Tel Aviv (IL)

( * ) Notice: Subject to any disclaimer, the term of this patent is extended or adjusted under 35 U.S.C. 154(b) by 0 days.

(21) Appl. No.: 19/048,504

(22) Filed: Feb. 7, 2025

(51) Int. Cl.
*H04L 9/40* (2022.01)
*G06F 21/62* (2013.01)
*H04L 41/16* (2022.01)

(52) U.S. Cl.
CPC ...... *H04L 63/1416* (2013.01); *G06F 21/6245* (2013.01); *H04L 41/16* (2013.01); *H04L 63/20* (2013.01)

(58) Field of Classification Search
CPC ..... H04L 63/1416; H04L 41/16; H04L 63/20; G06F 21/6245
USPC .......................................................... 713/176
See application file for complete search history.

(56) References Cited

U.S. PATENT DOCUMENTS

| | | | | |
|---|---|---|---|---|
| 8,613,040 B2 * | 12/2013 | Barile | G06F 21/552 726/1 |
| 8,862,522 B1 * | 10/2014 | Jaiswal | G06F 21/6209 706/12 |
| 9,069,983 B1 * | 6/2015 | Nijjar | G06F 21/6218 |
| 9,246,948 B2 * | 1/2016 | Jaiswal | G06F 21/10 |
| 9,843,564 B2 * | 12/2017 | Zucker | H04L 63/0428 |
| 10,904,277 B1 * | 1/2021 | Sharifi Mehr | H04L 63/1425 |
| 10,986,117 B1 * | 4/2021 | Agbabian | G06F 21/6218 |
| 11,853,454 B1 * | 12/2023 | Tarsi | G06F 21/602 |
| 2020/0137126 A1 * | 4/2020 | Yawalkar | H04L 63/1408 |
| 2020/0242269 A1 * | 7/2020 | Narayanaswamy | G06F 21/55 |
| 2020/0382536 A1 * | 12/2020 | Dherange | H04L 63/1425 |
| 2020/0412754 A1 * | 12/2020 | Crabtree | H04L 63/1425 |
| 2022/0309166 A1 * | 9/2022 | Shenoy | G06F 21/577 |
| 2025/0030705 A1 * | 1/2025 | Sinha | H04L 63/20 |

* cited by examiner

*Primary Examiner* — Badri Narayanan Champakesan
*Assistant Examiner* — Badri Champakesan
(74) *Attorney, Agent, or Firm* — M&B IP Analysts, LLC

(57) ABSTRACT

A system and method for applying policies across data loss prevention (DLP) systems of a computing environment is presented. The method includes receiving a plurality of events, including a first event from a DLP system, and a second event from a second DLP system, each providing a software service to the computing environment; normalizing the plurality of events into normalized events based on a normalizing schema; configuring a generative artificial intelligence (AI) model to output an event summary based on: a normalized event, a metadata associated with the normalized event, and an enrichment; configuring the generative AI model to output a severity based on: the normalized event, the metadata, the enrichment, and a service level agreement; configuring the generative AI model to output a reason based on the severity and the event summary; and initiating a remediation action based on an output of the generative AI model.

15 Claims, 4 Drawing Sheets

TECHNIQUES FOR CYBERSECURITY EVENT CLASSIFICATION IN DATAFLOW MANAGEMENT

TECHNICAL FIELD

The present disclosure relates generally to data loss prevention (DLP) systems, and specifically to classification of events in dataflow management.

BACKGROUND

Data Loss Prevention (DLP) refers to strategies, tools, and processes designed to prevent unauthorized access, sharing, or leakage of sensitive data. DLP involves monitoring and controlling data in use, in motion, and at rest to ensure compliance with security policies and regulatory requirements. DLP solutions detect, classify, and protect information such as personal data, intellectual property, and financial records, reducing the risk of data breaches.

A major challenge in cloud computing is the complexity of enforcing DLP across distributed and dynamic environments. Unlike on-premises infrastructure, cloud services operate under shared responsibility models, making visibility and control over data movement more difficult. Organizations must contend with multi-tenant architectures, diverse storage locations, and frequent data transfers between cloud providers, SaaS applications, and remote users.

Additionally, encryption, access management, and compliance enforcement vary across platforms, increasing the risk of accidental exposure or unauthorized access. The reliance on third-party cloud vendors further complicates the ability to monitor and secure data comprehensively, as security measures differ based on provider policies and configurations. These factors create significant challenges in maintaining data integrity and confidentiality while leveraging the benefits of cloud scalability and accessibility.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include receiving a plurality of events, including a first event from a first data loss prevention (DLP) system, and a second event from a second DLP system, each DLP system providing a software service to the computing environment. The method may also include normalizing each of the plurality of events into normalized events based on a predefined normalizing schema. The method may furthermore include configuring a generative artificial intelligence (AI) model to output an event summary based on: a normalized event, a metadata associated with the normalized event, and an enrichment of the normalized event. The method may in addition include configuring the generative AI model to output a severity based on: the normalized event, the metadata, the enrichment, and a service level agreement (SLA) of the computing environment. The method may moreover include configuring the generative AI model to output a reason based on the severity and the event summary. The method may also include initiating a remediation action in the computing environment based on an output of the generative AI model. Other embodiments of this aspect include corresponding computer systems, apparatus, and computer programs recorded on one or more computer storage devices, each configured to perform the actions of the methods.

Implementations may include one or more of the following features. The method may include: configuring the generative AI to generate the output with obfuscated sensitive data. The method may include: generating a tag based on the event summary; and storing the tag with the event summary. The method where the tag is any one of: personal identifiable information (PII), business information, intellectual property, sensitive data, and any combination thereof. The method may include: detecting at least a similar alert in a data lake of the computing environment; and generating the event summary further based on the detected at least a similar alert. The method may include: generating a prompt for the generative AI model including a retrieval augmented generation (RAG) based on the detected at least a similar event. The method may include: detecting a feedback associated with the detected at least a similar alert; and generating the RAG further based on the detected feedback. The method where the generative AI is a language model. The method where configuring the generative AI model to generate an output further may include: generating a prompt based on a predefined template. Implementations of the described techniques may include hardware, a method or process, or a computer tangible medium.

In one general aspect, non-transitory computer-readable medium may include one or more instructions that, when executed by one or more processors of a device, cause the device to: receive a plurality of events, including a first event from a first data loss prevention (DLP) system, and a second event from a second DLP system, each DLP system providing a software service to the computing environment; normalize each of the plurality of events into normalized events based on a predefined normalizing schema; configure a generative artificial intelligence (AI) model to output an event summary based on. A non-transitory computer-readable medium may also include a normalized event, a metadata associated with the normalized event, and an enrichment of the normalized event; configure the generative AI model to output a severity based on. Medium may furthermore include the normalized event, the metadata, the enrichment, and a service level agreement (SLA) of the computing environment; configure the generative AI model to output a reason based on the severity and the event summary; and initiate a remediation action in the computing environment based on an output of the generative AI model. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: receive a plurality of events, including a first event from a first data loss prevention (DLP) system, and a second event from a second DLP system, each DLP system providing a software service to the computing environment. The system may in addition normalize each of the plurality of events into normalized events based on a predefined normalizing schema. The system may moreover configure a generative artificial intelligence (AI) model to output an event summary based on. The system may also include a normalized event, a metadata associated with the normalized event, and an enrichment of the normalized event. The system may furthermore configure the generative AI model to output a severity based on. The system may in addition include the normalized event, the metadata, the enrichment, and a service level agreement (SLA) of the computing environment. The system may moreover configure the generative AI model to output a reason based on the severity and the event summary. The system may also initiate a remediation action in the computing environment based on an output of the generative AI model. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: configure the generative AI to generate the output with obfuscated sensitive data. The system where the memory contains further instructions which when executed by the processing circuitry further configure the system to: generate a tag based on the event summary; and store the tag with the event summary. The system where the tag is any one of: personal identifiable information (PII), business information, intellectual property, sensitive data, and any combination thereof. The system where the memory contains further instructions which when executed by the processing circuitry further configure the system to: detect at least a similar alert in a data lake of the computing environment; and generate the event summary further based on the detected at least a similar alert. The system where the memory contains further instructions which when executed by the processing circuitry further configure the system to: generate a prompt for the generative AI model including a retrieval augmented generation (RAG) based on the detected at least a similar event. The system where the memory contains further instructions which when executed by the processing circuitry further configure the system to: detect a feedback associated with the detected at least a similar alert; and generate the RAG further based on the detected feedback. The system where the generative AI is a language model. The system where the memory contains further instructions that, when executed by the processing circuitry for configuring the generative AI model to generate an output, further configure the system to: generate a prompt based on a predefined template. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
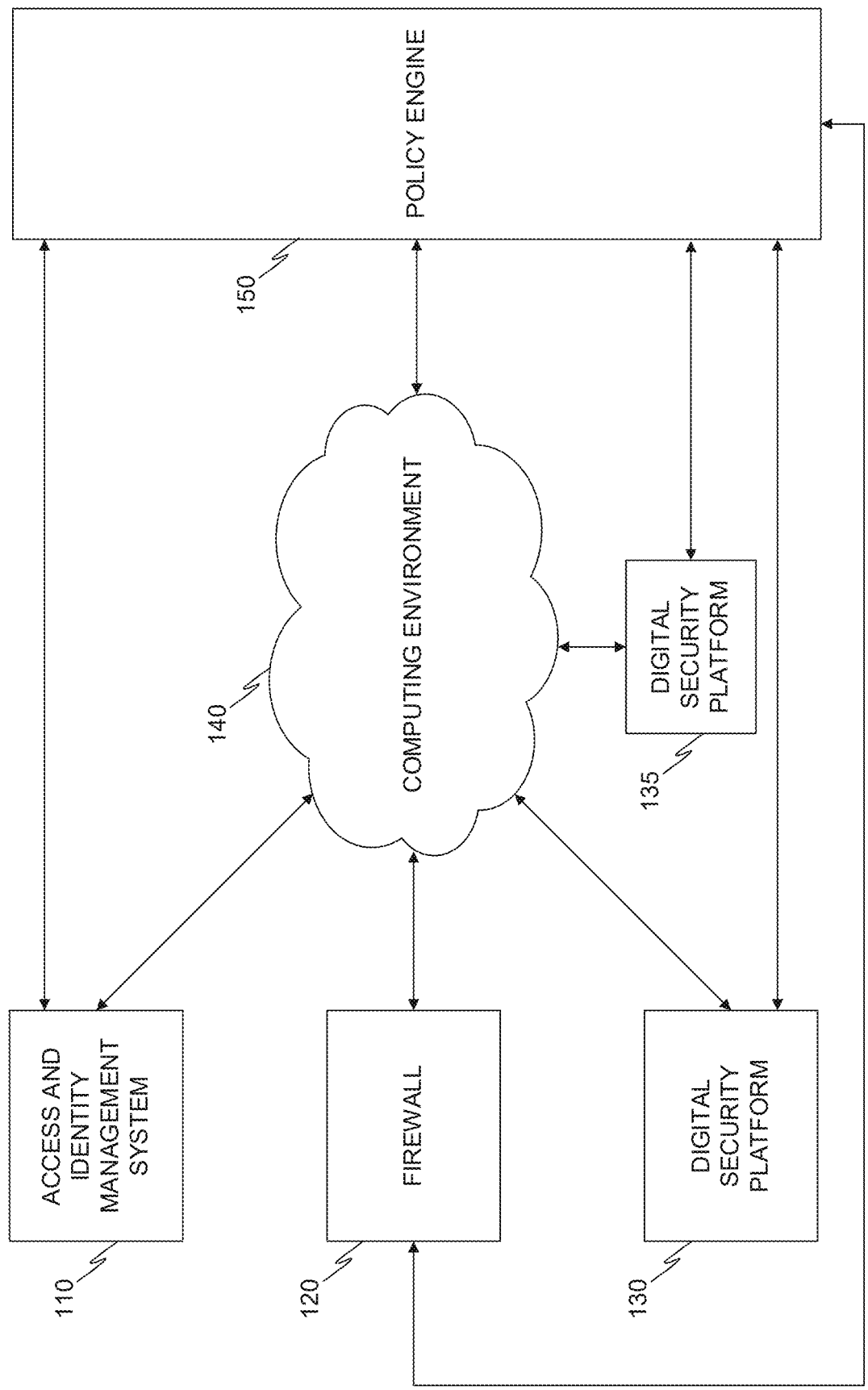
FIG. 1 is an example schematic diagram of a computing environment with a plurality of digital security platforms, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic diagram of a computing environment with a plurality of digital security platforms, utilized to describe an embodiment. In an embodiment, a computing environment 140 includes a cloud computing environment, a hybrid computing environment, an on-prem computing environment, various combinations thereof, and the like.

According to an embodiment, a cloud computing environment includes a virtual private cloud (VPC), a virtual network (VNet), a virtual private network (VPN), various combinations thereof, and the like. In an embodiment, a cloud computing environment is deployed on a cloud computing infrastructure, such as Amazon® Web Services (AWS), Microsoft Azure®, Google® Cloud Platform (GCP), and the like. In some embodiments, the computing environment 140 includes a plurality of different cloud computing environments, each deployed on a different cloud computing infrastructure.

In an embodiment, the computing environment 140 includes resources, identities, and the like. In some embodiments, resources in the computing environment 140 communicate over a network infrastructure of the computing environment 140. In some embodiments, various platforms, systems, and the like, are deployed on the computing environment 140, in the computing environment 140, etc., which include policies.

In some embodiments, a policy is a rule, a conditional rule, and the like, which are applied to determine a state, for example of an entity of the computing environment 140. In certain embodiments, a policy pertains to a resource, to a user account, to a network traffic type, combinations thereof, and the like.

For example, according to an embodiment, an identity and access management (IAM) system 110 is configured to apply policies for accessing resources in the computing environment 140, performing authentication respective of user accounts, etc. In an embodiment, an IAM system 110 is, for example, Okta®. In some embodiments, the IAM system 110 includes a plurality of policies. In an embodiment, policies of the IAM system 110 are stored in a first policy language.

In certain embodiments, a policy language is a computing language in which policy rules, conditions, and the like, are stored. In some embodiments, the policy language includes a declaratory language, a regular expression (regex), Boolean notation, a combination thereof, and the like.

In an embodiment, the computing environment 140 further includes, or is otherwise operable with, a firewall 120. In some embodiments, a firewall 120 is configured to filter network traffic between resources of the computing environment 140, between resources of the computing environment 140 and an external network (not shown), between the computing environment 140 and a public network, such as the Internet, and the like.

In some embodiments, the firewall 120 includes a web application firewall (WAF), application firewall, stateful firewall, packet filter, a combination thereof, and the like. In an embodiment, the firewall 120 includes a deep packet inspection (DPI) module. In certain embodiments, the firewall 120 includes routing tables, rules, policies, and the like, which are utilized to filter network traffic.

In certain embodiments, the firewall 120 includes rules, policies, and the like, which are stored utilizing a second policy language, which is different from a policy language utilized, for example, by the IAM system 110.

In an embodiment, the computing environment 140 utilizes, or is otherwise subject to, a plurality of digital security platforms (DSPs), such as DSP 130, each having a policy stored in a unique policy language.

In some embodiments, each policy language includes constraints which are unique to that policy language. For example, in an embodiment, a first policy language only includes regex rules up to one thousand characters in length. In certain embodiments, the digital security platform is, for example, a data loss prevention (DLP) software.

According to an embodiment, a policy engine 150 is configured to normalize policies received from a plurality of DSPs, such as DSP 130, firewall 120, and IAM server 110. In an embodiment, normalizing a policy includes receiving a policy from a DSP, such as DSP 130, and generating a normalized policy based on the received policy. In some embodiments, a normalized policy is generated based on a predefined data schema, which includes a plurality of data fields, at least a portion of which conform to data fields of the received policy.

In some embodiments, the policy engine 150 includes rules, conditional rules, and the like, which are utilized to generate the normalized policy based on a received policy. In an embodiment, the policy engine 150 includes a generative artificial intelligence (GenAI) which is configured to generate a normalized policy. In an embodiment, the GenAI is a language model, such as a large language model (LLM), small language model (SLM), and the like.

In an embodiment, an LLM is configured to generate a normalized policy based on a predetermined prompt, which, when processed by the LLM, configures the LLM to generate an output which includes a normalized policy. In some embodiment, the prompt is modified, for example, based on the received policy.

In certain embodiments, the policy engine 150 is configured to generate a policy in a first policy language, based on a received policy which is stored in a second policy language. In an embodiment, the policy engine 150 is configured to receive a policy in a first policy language, generate a normalized policy based on the received policy, and generate a policy in a second policy language based on the normalized policy.

In some embodiments, the policy engine 150 is configured to send a policy generated in a second policy language to a second DSP 135 which is configured to apply policies in the second policy language.

Figure 2:
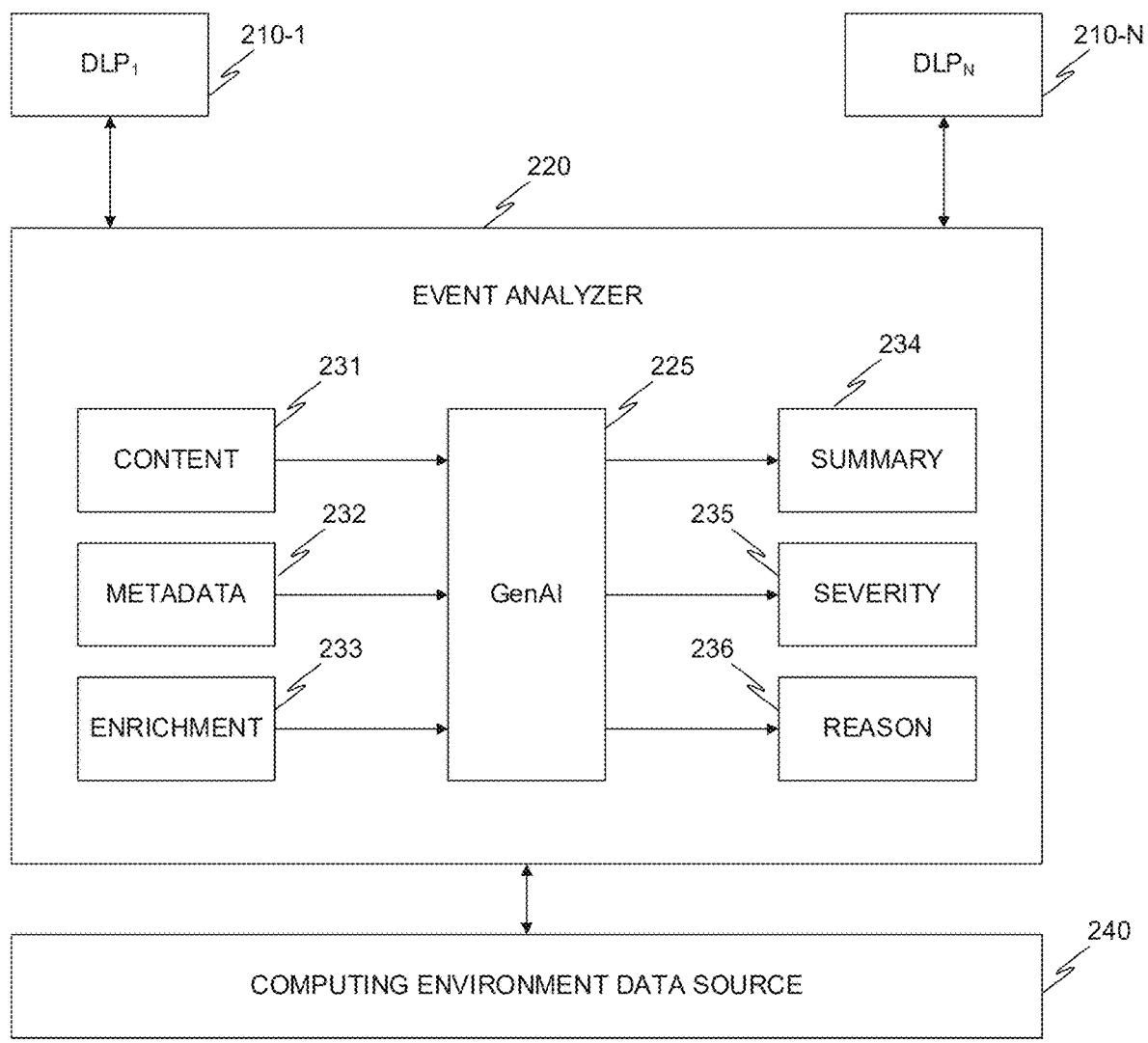
FIG. 2 is an example diagram of a data loss prevention (DLP) event analyzer, implemented in accordance with an embodiment.

FIG. 2 is an example diagram of a data loss prevention (DLP) event analyzer, implemented in accordance with an embodiment. In an embodiment, a DLP is a digital security platform (DSP), for example, such as DSP 130 of FIG. 1 above.

In an embodiment, an event analyzer 220 is configured to receive events from a plurality of DLP systems 210-1 through 210-N, referred to individually as DLP 210, and collectively as DLP systems 210, where 'N' is an integer having a value of '2' or greater.

According to an embodiment, a DLP system 210 is configured to monitor data transfers to cloud storage, USB devices, and email, from a computing environment, such as computing environment 140 of FIG. 1 above. DLP system 210 is provided, for example, by CheckPoint®, Symantec®, Broadcom®, and the like.

In an embodiment, a DLP system 210 is configured to generate an event in response to monitored data of the computing environment triggering a rule of the DLP system 210. In some embodiments, the event includes data, content, and the like. For example, an event includes, in an embodiment, an identifier of a user account, a content, a destination, and the like. In an embodiment, the content is data, information, etc. For example, content is a file, a file format, a document, a spreadsheet, a presentation, an output from a database, an email, a combination thereof, and the like.

In some embodiments, the event includes metadata of the event. For example, in an embodiment, a packet destination, an email destination, a destination IP address, and the like, are metadata of an event.

According to an embodiment, the event analyzer 220 is configured to generate enriched data based on a received event. For example, in an embodiment, the event analyzer 220 is configured to parse an event to detect identifiers. In some embodiments, the event analyzer 220 is configured to utilize an identifier to from an event content 231, an event metadata 232, and the like, to generate an enrichment 233.

For example, an event is analyzed to extract therefrom an identity of a user account. In an embodiment, a computing environment data source 240 is queried based on the extracted identity. In some embodiments, the data source 240 is an identity provider (IdP), a data lake, a database, an identity an access management (IAM) service, a knowledgebase, a combination thereof, and the like.

In certain embodiments, a knowledgebase includes a Confluence® page, a Wiki™ platform, and the like. In some embodiments, an IdP is, for example, Microsoft® Active Directory, an HR system, and the like.

In the above example, the data source 240 is an IdP and a permission associated with the user account is extracted. In some embodiments, the event is further analyzed based on the content. For example, in an embodiment, a content is a content of a file, e.g., a file being transferred by a user account via email to another account.

In certain embodiments, the content of the alert, content of the file, and the like, are scanned for sensitive data. Sensitive data is, for example, PII, PCI, PHI, and the like. In an embodiment, metadata 232 is utilized to generate enrichment data 233. For example, in some embodiments, a destination (e.g., email address destination, IP address destination, etc.) is utilized to determine if the destination is an approved destination, if the destination is an approved destination for the user account, etc. In some embodiments, a reputation is determined for the destination, for example, associated with a domain (i.e., domain reputation), an IP reputation, etc.

In an embodiment, the event analyzer 220 includes a generative artificial intelligence (AI) model 225. In some embodiments, the generative AI model 225 is a language model, such as a large language model (LLM), a small language model (SLM), and the like. In an embodiment, the generative AI model 225 is a multi-modal model, a unimodal model, etc.

In some embodiments, the generative AI model 225 is configured to utilize retrieval augmented generation (RAG) techniques. For example, in some embodiments, the generative AI model 225 is configured to receive an event including a content 231, a metadata 232, and an enrichment 233. In certain embodiments, the generative AI model 225 is configured to utilize a RAG based on any one of: the content 231, the metadata 232, the enrichment 233, and any combination thereof.

In an embodiment, the generative AI model 225 is configured to receive a prompt, for example, generated based on a predefined template, and output a summary 234. In some embodiments, the summary 234 is generated based on a prompt which outputs a summary in natural language based on any one of: the content 231, the metadata 232, the enrichment 233, and any combination thereof.

In certain embodiments, the generative AI model 225 is further configured to generate a severity assessment 235 based on any one of: the summary 234, the content 231, the metadata 232, the enrichment 233, and any combination thereof. In an embodiment, the severity assessment 235 includes a false positive assessment, a qualitative score, a quantitative score, a combination thereof, and the like.

In some embodiments, the generative AI model 225 is configured to generate a reason 236. In an embodiment, the reason 236 is an output, such as a natural language output, which includes a reasoning, for example of the severity 235. In certain embodiments, the generative AI model 225 is configured to generate the reasoning based on a predefined prompt template, which is modified based on the summary 234, the severity 235, the enrichment data 233, the metadata 232, the content 231, a combination thereof, and the like.

In an embodiment, the generative AI model 225 is configured to generate a reason 236 which includes a natural language explanation of why the generative AI model 225 generated certain values of the severity 235, of the summary 234, etc.

Figure 3:
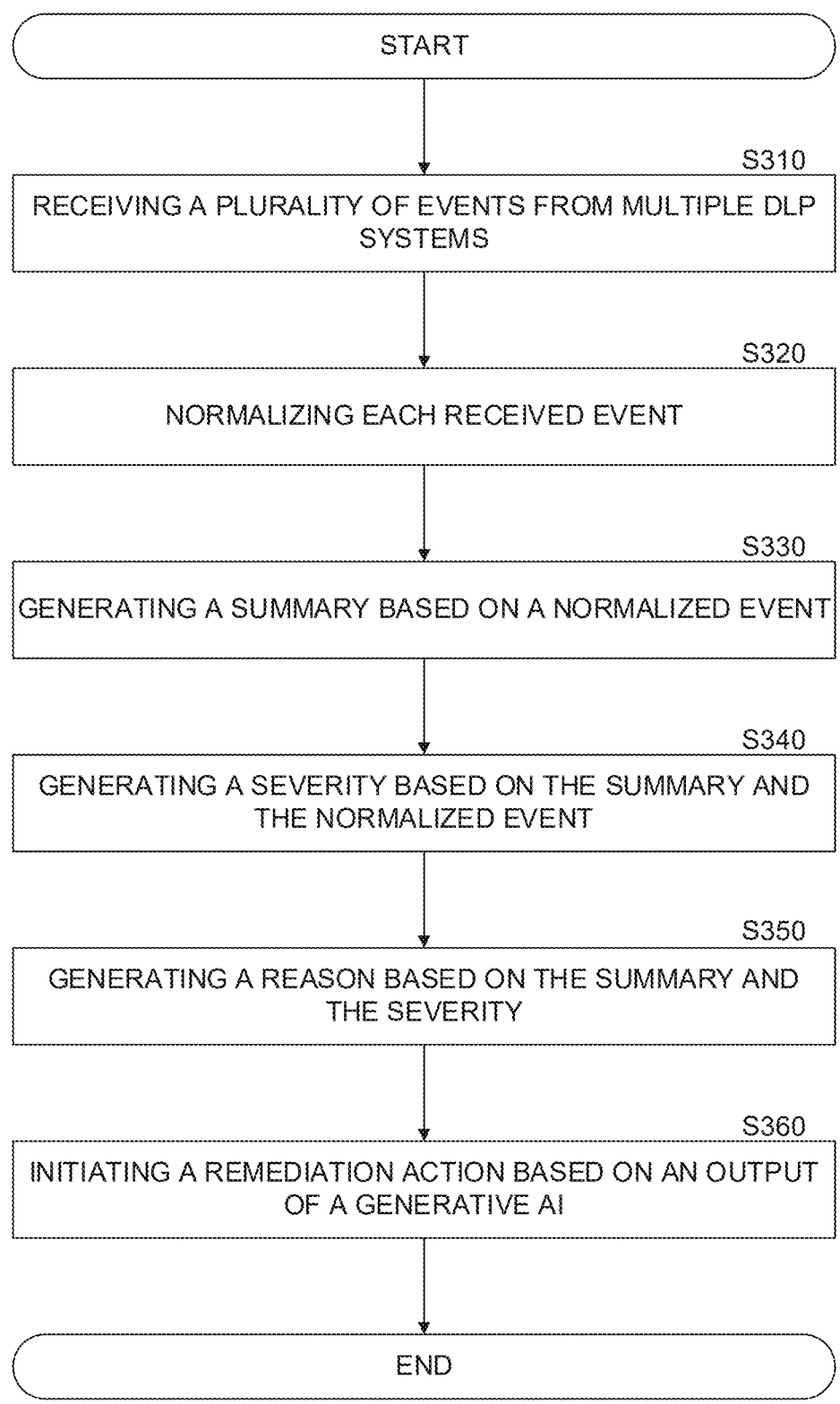
FIG. 3 is an example flowchart of a method for performing event analysis of a data loss prevention system (DLP), implemented in accordance with an embodiment.

FIG. 3 is an example flowchart of a method for performing event analysis of a data loss prevention system (DLP), implemented in accordance with an embodiment. In some embodiments, a plurality of DLP systems provide service to a single computing environment, such as a cloud computing environment, an on-prem computing environment, a hybrid computing environment, a combination thereof, and the like.

It is advantageous, in certain embodiments, to perform event analysis on an event utilizing multiple DLP systems to provide a broader context from the entire computing environment, especially where certain DLP systems are configured to perform tasks which are not performed by other DLP systems, such that these systems complement each other.

At S310, a plurality of DLP events are received. In an embodiment, the plurality of DLP events include a first DLP event from a first DLP system, and a second DLP event from a second DLP system, which is not the first DLP system. In some embodiments, a DLP event includes data (i.e., content), and metadata.

In an embodiment, data includes a content such as a content of a file, e.g., a file being transferred by a user account via email to another account. In certain embodiments, the content of a DLP event, content of the file, and the like, are scanned for sensitive data. Sensitive data is, for example, PII, PCI, PHI, and the like.

In an embodiment, metadata is utilized to generate enrichment data. In certain embodiments, metadata includes a destination (e.g., email address destination, IP address destination, etc.)

At S320, each received event is normalized. In an embodiment, a DLP event is normalized by a policy engine 150. For example, in some embodiments, the policy engine 150 is configured to normalize policies, events, and the like, from a plurality of DLP systems into a normalized event.

In certain embodiments, normalizing a received DLP event includes determining a schema utilized by the DLP system, mapping the determined schema of the DLP system into a normalized data schema, extracting values from the received DLP event, and generating a normalized DLP event based on the extracted values and the normalized data schema.

At S330, a summary is generated based on the normalized event. In some embodiments, a generative AI model is configured to generate the summary based on the normalized event. In an embodiment, enrichment is additionally generated based on the DLP event.

For example, in an embodiment, a normalized DLP event is parsed to detect values therein. In some embodiments, the normalized DLP event is processed, for example by a generative AI model to extract values therefrom. In an embodiment, an extracted value is utilized, for example by an event analyzer, to query a data source of the computing environment.

In an embodiment, a data source is an identity provider, a knowledgebase, a policy engine, a combination thereof, and the like. In certain embodiments, a data source is an API of a computing environment, such as an API of an Amazon® Web Service (AWS) cloud computing environment.

In some embodiments, the summary is generated based on a content of a DLP event, a metadata associated with the DLP event, an enrichment of the DLP event, a combination thereof, and the like.

For example, in certain embodiments, metadata includes a destination for the content, which is utilized to determine if the destination is an approved destination, if the destination is an approved destination for the user account, etc. In some embodiments, a reputation is determined for the destination, for example, associated with a domain (i.e., domain reputation), an IP reputation, etc.

In an embodiment, the generative AI model is a language model, such as a large language model (LLM), a small language model (SLM), and the like. In an embodiment, an LLM is a transformer, such as a GPT model, a BERT model, a LLaMa model, and the like. In some embodiments, a generative AI model is provided with a prompt, a context, a RAG, a combination thereof, and the like. In certain embodiments, the prompt is generated by an event analyzer based on a predefined prompt template. In an embodiment, the context, the RAG, etc., is extracted from a data source of the computing environment.

In an embodiment, the summary is generated based on a plurality of data events. In some embodiments, each data event (e.g., normalized DLP event) is a data event originating from a different DLP system, such that a first DLP system generates a first DLP event, and a second DLP system generates a second DLP event, wherein the summary is generated based on both the normalized first DLP event and the normalized second DLP event.

At S340, a severity is generated. In an embodiment, the severity includes a determination of a positive event, a false positive event, etc., with respect to the DLP event. In some embodiments, severity is determined based on a cybersecurity risk which is determined based on the generated summary.

In some embodiments, the severity is generated by a generative AI model. In certain embodiments, the severity is generated by the generative AI model based on a prompt, a modified prompt, and the like. In an embodiment, a prompt is modified based on a normalized DLP event, a content, a metadata, an event summary, a combination thereof, and the like.

In certain embodiments, the severity is generated based on a plurality DLP events, a plurality of normalized DLP events, etc. In some embodiments, a severity is generated based on a first normalized DLP event from a first DLP system, and further base on a second normalized DLP event from a second DLP system.

At S350, a reason is generated. In an embodiment, the reason is generated by a generative AI model. In certain embodiments, the reason includes a natural language response and is generated by the generative AI model based on a prompt, a modified prompt, and the like. In an embodiment, a prompt is modified based on a normalized DLP event, a content, a metadata, an event summary, a severity, a combination thereof, and the like.

In an embodiment, the reason is generated to include an explanation of the determined severity, the summary, an output of a generative AI, a combination thereof, and the like.

At S360, a remediation action is initiated. In an embodiment, the remediation action includes generating an alert, initiating an action in a computing environment, initiating an action in a DLP system, a combination thereof, and the like.

In certain embodiments, the remediation action includes generating an alert based on the normalized event, the summary, the severity, the reason, a combination thereof, and the like.

In an embodiment, the remediation action includes revoking access from a user account, revoking access from a resource, updating a policy of a DLP, changing a policy of a DLP, generating a policy of a DLP, a combination thereof, and the like.

Figure 4:
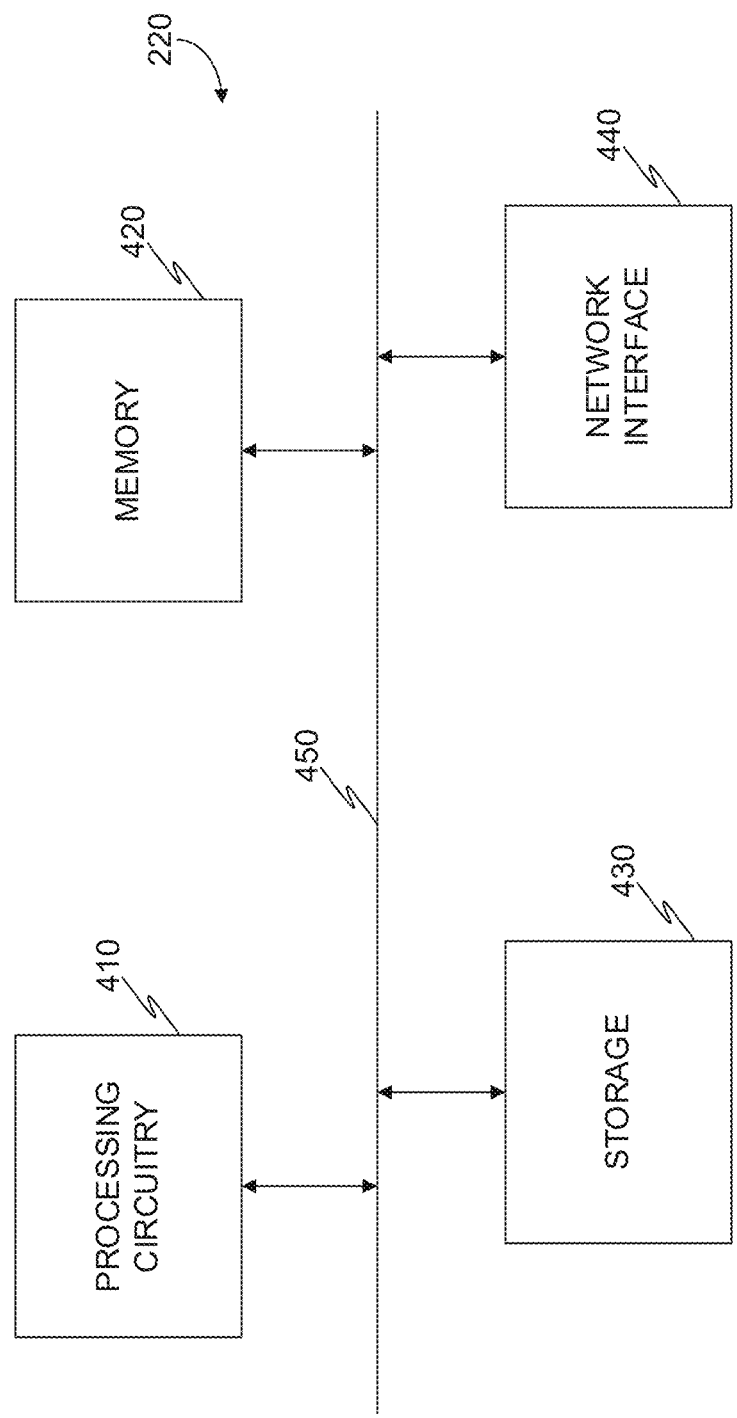
FIG. 4 is an example schematic diagram of an event analyzer according to an embodiment.

FIG. 4 is an example schematic diagram of an event analyzer 220 according to an embodiment. The event analyzer 220 includes, according to an embodiment, a processing circuitry 410 coupled to a memory 420, a storage 430, and a network interface 440. In an embodiment, the components of the event analyzer 220 are communicatively connected via a bus 450.

In certain embodiments, the processing circuitry 410 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 420 is a volatile memory (e.g., random access memory, etc.), a non-volatile memory (e.g., read only memory, flash memory, etc.), a combination thereof, and the like. In some embodiments, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein is stored in the storage 430, in the memory 420, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 410, cause the processing circuitry 410 to perform the various processes described herein, in accordance with an embodiment.

In some embodiments, the storage 430 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 440 is configured to provide the event analyzer 220 with communication with, for example, the computing environment data source 240, according to an embodiment.

It should be understood that the embodiments described herein are not limited to the specific architecture illustrated in FIG. 4, and other architectures may be equally used without departing from the scope of the disclosed embodiments.

Furthermore, in certain embodiments the policy engine 150, the event analyzer 220, a combination thereof, and the like, may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for applying policies across data loss prevention systems of a computing environment, comprising:
    receiving a plurality of events, including a first event from a first data loss prevention (DLP) system, and a second event from a second DLP system, each DLP system providing a software service to the computing environment;
    normalizing each of the plurality of events into normalized events based on a predefined normalizing schema;
    detecting at least a similar event in a data store of the computing environment;
    generating a prompt for a generative artificial intelligence (AI) model including a retrieval augmented generation (RAG) based on the detected at least a similar event;
    configuring the generative AI model to output an event summary based on: a normalized event, a metadata associated with the normalized event, the generated prompt, and an enrichment of the normalized event;
    configuring the generative AI model to output a severity based on: the normalized event, the metadata, the enrichment, and a service level agreement (SLA) of the computing environment;
    configuring the generative AI model to output a reason based on the severity and the event summary; and
    initiating a remediation action in the computing environment based on an output of the generative AI model.

2. The method of claim 1, further comprising:
    configuring the generative AI to generate the output with obfuscated sensitive data.

3. The method of claim 1, further comprising:
    generating a tag based on the event summary; and
    storing the tag with the event summary.

4. The method of claim 3, wherein the tag is any one of: personal identifiable information (PII), business information, intellectual property, sensitive data, and any combination thereof.

5. The method of claim 1, further comprising:
    detecting a feedback associated with the detected at least a similar alert; and
    generating the RAG further based on the detected feedback.

6. The method of claim 1, wherein the generative AI is a language model.

7. The method of claim 6, wherein configuring the generative AI model to generate an output further comprises:
    generating a prompt based on a predefined template.

8. A non-transitory computer-readable medium storing a set of instructions for applying policies across data loss prevention systems of a computing environment, the set of instructions comprising:
    one or more instructions that, when executed by one or more processors of a device, cause the device to:
        receive a plurality of events, including a first event from a first data loss prevention (DLP) system, and a second event from a second DLP system, each DLP system providing a software service to the computing environment;
        normalize each of the plurality of events into normalized events based on a predefined normalizing schema;
        detect at least a similar event in a data store of the computing environment;
        generate a prompt for a generative artificial intelligence (AI) model including a retrieval augmented generation (RAG) based on the detected at least a similar event;
        configure the generative AI model to output an event summary based on: a normalized event, a metadata associated with the normalized event, the generated prompt, and an enrichment of the normalized event;
        configure the generative AI model to output a severity based on:
    the normalized event, the metadata, the enrichment, and a service level agreement (SLA) of the computing environment;
        configure the generative AI model to output a reason based on the severity and the event summary; and
        initiate a remediation action in the computing environment based on an output of the generative AI model.

9. A system for applying policies across data loss prevention systems of a computing environment comprising:
    a processing circuitry;
    a memory, the memory containing instructions that, when executed by the processing circuitry, configure the system to:
        receive a plurality of events, including a first event from a first data loss prevention (DLP) system, and a second event from a second DLP system, each DLP system providing a software service to the computing environment;
        normalize each of the plurality of events into normalized events based on a predefined normalizing schema;
        detect at least a similar event in a data store of the computing environment;
        generate a prompt for a generative artificial intelligence (AI) model including a retrieval augmented generation (RAG) based on the detected at least a similar event;

configure the generative AI model to output an event summary based on: a normalized event, a metadata associated with the normalized event, the generated prompt, and an enrichment of the normalized event;

configure the generative AI model to output a severity based on: the normalized event, the metadata, the enrichment, and a service level agreement (SLA) of the computing environment;

configure the generative AI model to output a reason based on the severity and the event summary; and initiate a remediation action in the computing environment based on an output of the generative AI model.

10. The system of claim 9, wherein the memory contains further instructions which when executed by the processing circuitry further configure the system to:

configure the generative AI to generate the output with obfuscated sensitive data.

11. The system of claim 9, wherein the memory contains further instructions which when executed by the processing circuitry further configure the system to:

generate a tag based on the event summary; and
store the tag with the event summary.

12. The system of claim 11, wherein the tag is any one of: personal identifiable information (PII), business information, intellectual property, sensitive data, and any combination thereof.

13. The system of claim 9, wherein the memory contains further instructions which when executed by the processing circuitry further configure the system to:

detect a feedback associated with the detected at least a similar alert; and generate the RAG further based on the detected feedback.

14. The system of claim 9, wherein the generative AI is a language model.

15. The system of claim 14, wherein the memory contains further instructions that, when executed by the processing circuitry for configuring the generative AI model to generate an output, further configure the system to:

generate a prompt based on a predefined template.

* * * * *